April 1, 1958     I. L. GIETTER     2,829,341
CELL FOR MOISTURE MEASUREMENTS
Filed April 26, 1954     2 Sheets-Sheet 1

INVENTOR
IRVING L. GIETTER

BY Rudolph J. Jurick

ATTORNEY

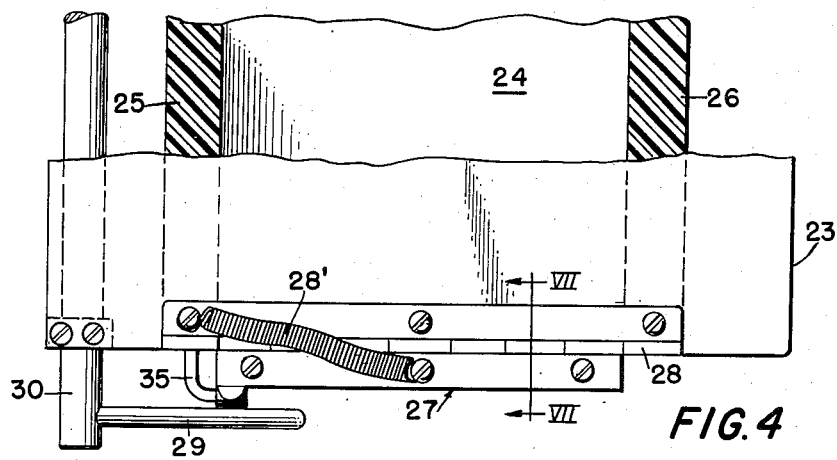# 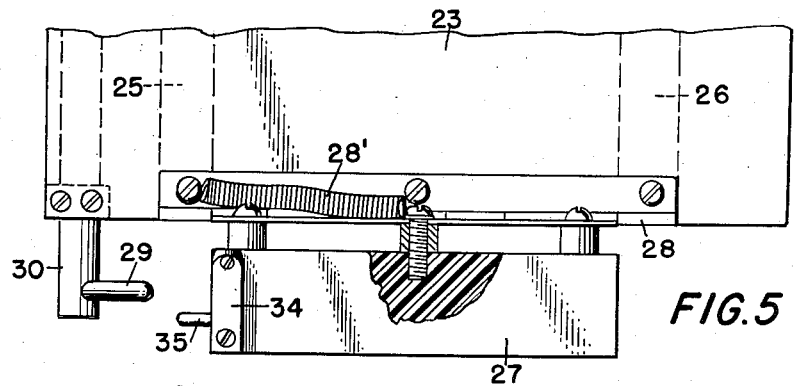 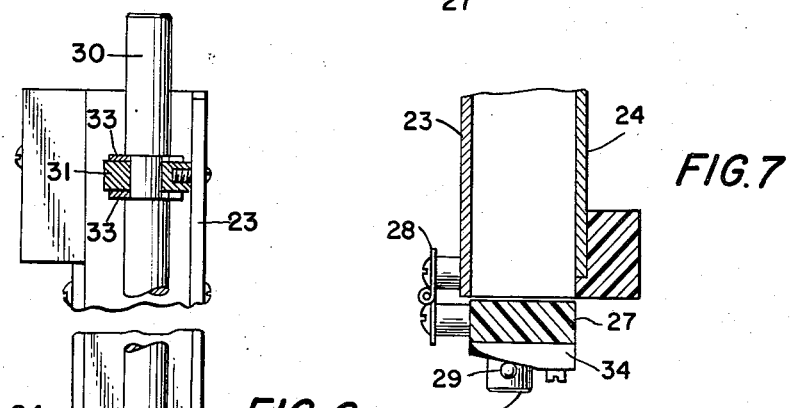 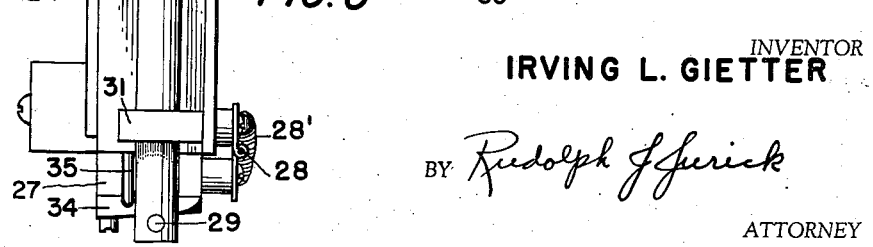

United States Patent Office 2,829,341
Patented Apr. 1, 1958

2,829,341

CELL FOR MOISTURE MEASUREMENTS

Irving L. Gietter, Irvington, N. J., assignor to Weston Electrical Instrument Corporation, Newark, N. J., a corporation of New Jersey Application April 26, 1954, Serial No. 425,472

8 Claims. (Cl. 324—65)

This invention relates to a cell for use in the electrical measurement of the moisture content of granular substances, and more particularly to the closure for such a cell.

Apparatus is known for the measurement of the moisture content of granular materials introduced between the plates of an electrical condenser. The condenser plates usually constitute the opposite sides of a receptacle or cell, generally of rectangular cross-section, into which the material is placed for measurement of its moisture content in terms of the change in capacitance of the condenser.

An object of this invention is the provision of a cell for such measurements which includes an open top for the introduction of the test material, and a hinged bottom through which the material may be discharged by gravity at the completion of a moisture content measurement.

More specifically, an object of this invention is the provision of such cell having smooth interior walls from which the test material drops readily by gravity and a hinged trap door bottom having cam mechanism for closing the same.

These and other objects of the invention will be apparent from the following specification when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 4 is a fragmentary front elevation, with parts in section, of another cell embodying the invention, and which includes a spring for opening the trap door;

Figure 5 is a similar fragmentary elevation but showing the door in open position;

Figure 6 is a fragmentary side view showing the trap door in closed position; and Figure 7 is a fragmentary, vertical sectional view along the line VII—VII of Figure 4, in the direction of the arrows.

Figure 1:
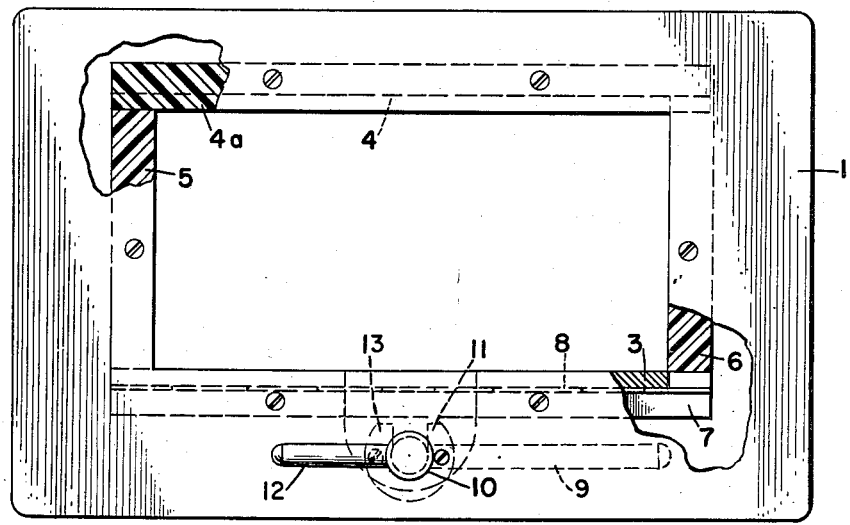
Figure 1 is a top plan view, with parts in section, of a moisture testing cell embodying the invention, as seen with the bottom trap door fully open.
Figure 2:
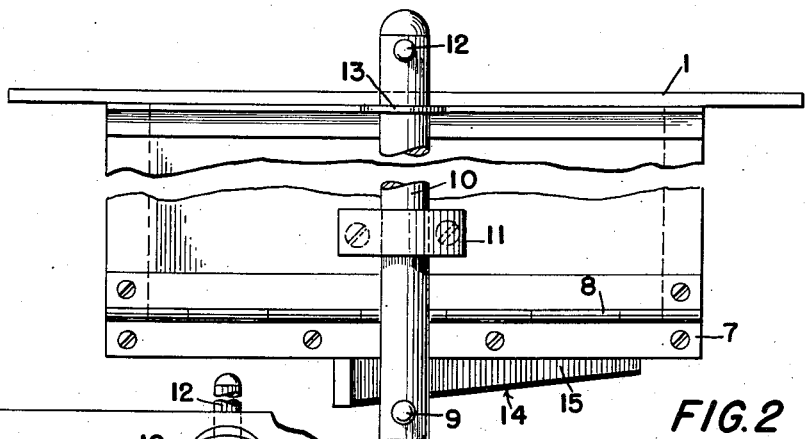
Figure 2 is a side elevation of the same but showing the trap door closed.
Figure 3:
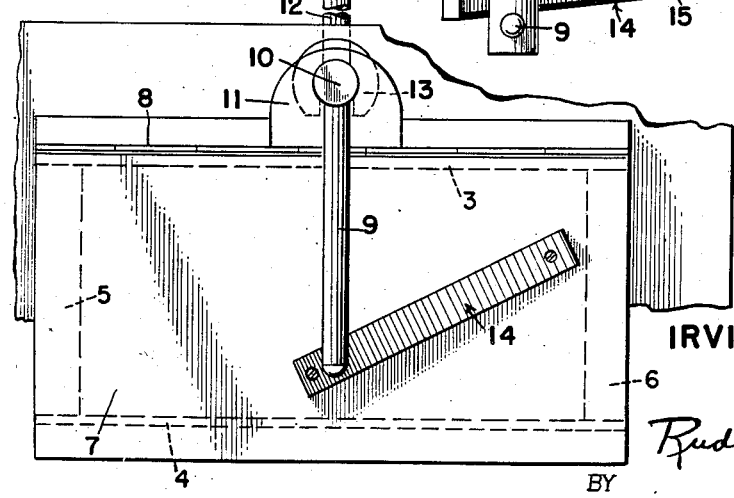
Figure 3 is a bottom plan view of the cell with the door in closed position.

In Figure 1 and 2 of the drawings, the reference numeral 1 identifies a plate from which the cell may be suspended for mounting in an opening in a table upon which plate 1 rests, said plate being secured to the table in any desired manner. The front and back walls of the cell, as seen in Figure 1, are covered by the metal plates 3 and 4 which constitute the condenser electrodes of the cell and which are spaced apart and insulated from each other by the side walls 5, 6 made of insulating material.

The top edges of the electrode plates 4 and 5 are spaced from the mounting plate 1 by a strip 4a of insulating material to prevent a short-circuiting of the cell by the mounting plate. The bottom wall of the cell is a trap door 7 of insulating material which is secured to the front wall 3 by a hinge 8.

The trap door drops open by gravity through an angle of about 90° to discharge a sample at the completion of a test and may be closed by an arm 9 on a shaft 10 which extends through the mounting plate 1 and a bearing bracket 11 secured to the front wall of the cell. The shaft 10 is provided with a handle 12 which is retained above the table top by a C-clip 13 which fits into a circumferential groove of the shaft. The shaft 10 may be turned counterclockwise from the position shown in Figure 1 to engage and sweep across the metal facing 14 on a wedge-shaped block 15 secured to the bottom of the trap door 7, thus camming the door into the closed position. The slope of the wedge block 15 is relatively small and a slight further rotation of shaft 10 after the door is fully closed provides a positive lock which prevents a backward movement of arm 9 and an inadvertent release of the trap door 7.

Reverse motion of the shaft 10 removes the arm 9 from wedge plate 15 and drops the test sample from the cell as the metal and insulating walls are smooth and preferably polished to offer no obstruction to the intended discharge of the material. Upon closing the trap door, a measured amount, preferably a weighed amount, of the material is introduced into the open upper end of the cell and the apparatus is ready for a further moisture measurement.

In the embodiment shown in Figures 4–6, the front and back condenser electrodes 23, 24 are spaced apart and insulated from each other by side walls 25, 26 of insulating material to form a cell of rectangular form. The trap door, or bottom wall, 27 of insulating material is mounted on the front wall 23 by a hinge 28 and is yieldingly urged towards open position by a spring 28'. An arm 29 for closing the trap door is secured to a shaft 30 journalled in bearing brackets 31 secured to the plate 23, the shaft being anchored against longitudinal movement by C-clips 33 which are fitted into circumferential grooves in the shaft.

A cam or slightly tapered metal block 34 is secured to the bottom of the trap door 27 adjacent the shaft 30 and has a bent rod 35 secured thereto to seat against the bottom of the side wall 25 when the trap door is fully closed. This stop rod is necessary since, as shown in Figure 6, the trap door is relatively narrow and does not seat against the condenser plates 23, 24 when closed. The advantage of this feature is that there is no possibility that grain or other granular material may be caught between the trap door and the walls of the cell and thereby prevent a positive and complete closure of the trap door.

The electrical measuring circuit with which the cell is employed in moisture measurements forms no part of the present invention and therefore is not illustrated.

While the invention has been described as embodied in a trap door for the bottom of a cell of rectangular cross-section, it is to be understood that the shape of the container and the relative location of the hinged closure may be varied without departure from the spirit and scope of the invention as set forth in the following claims.

I claim:

1. A container having walls defining a material-receiving space, a closure member having a hinge securing the same to one of said walls for pivotal movement about an axis between open and closed position, and means for closing said closure member; said closing means comprising a shaft extending exteriorly along one of the walls of said container and means supporting the same for rotation about its axis while preventing axial movement, wedge means on said closure member at the side thereof opposite said material-receiving space, means secured to and disposed adjacent one end of said shaft for turning the same, and means secured to and disposed adjacent the other end of said shaft and movable thereby through a large angle to engage said wedge means to move said member through an angle of about 90° to closed position.

2. A container as recited in claim 1, wherein said walls are vertically arranged, and said closure member is an end closure secured by said hinge to one of said walls adjacent an end thereof.

3. A container as recited in claim 2, wherein said walls are planar and define a material-receiving space of rectangular cross-section, and said closure member is a trap door.

4. A container as recited in claim 3, in combination with spring means urging said closure member towards open position.

5. A container as recited in claim 3, wherein said closure member has the dimensions and cross-section of said material-receiving space, whereby said closure member does not seat against the bottoms of said walls when closed, in combination with cooperating stop means to arrest said closure member when its top surface reaches the plane of the lower ends of said walls during a closing operation.

6. A container as recited in claim 3, wherein said closure seats against the ends of said walls when closed.

7. A cell for use in the electrical measurement of the moisture content of material, said cell comprising opposed metal plates spaced by insulative end members and forming a material-receiving chamber, a trap door pivotally secured to one of said plates and movable to a first position to close an end of the chamber and to a second position to completely open such end of the chamber, a wedge secured to the trap door at the side thereof opposite the chamber, a shaft disposed external of the chamber, means supporting the shaft on one of the said walls for rotation about its axis, an arm extending from said shaft and disposed in a plane intersecting the plane of said wedge when the trap door is in the open position; the recited arrangement being such that rotation of the shaft brings the arm into contact with the wedge and upon further rotation of the shaft the said arm will slide along the wedge to move the trap door into the closed position.

8. The invention as recited in claim 7, in combination with spring means normally biasing the trap door to the open position, and stop means defining the closed position of the trap door.

References Cited in the file of this patent

UNITED STATES PATENTS

| | | |
|---|---|---|
| 444,826 | Gloekler | Jan. 20, 1891 |
| 662,529 | Frerking | Nov. 27, 1900 |
| 2,251,641 | Stein | Aug. 5, 1941 |
| 2,422,742 | Odessey | June 24, 1947 |
| 2,690,274 | Thurston | Sept. 28, 1954 |